H. GEISENHÖNER.
PROCESS AND APPARATUS FOR PRODUCING LINE WELDS.
APPLICATION FILED SEPT. 29, 1916.
1,264,058.
Patented Apr. 23, 1918.
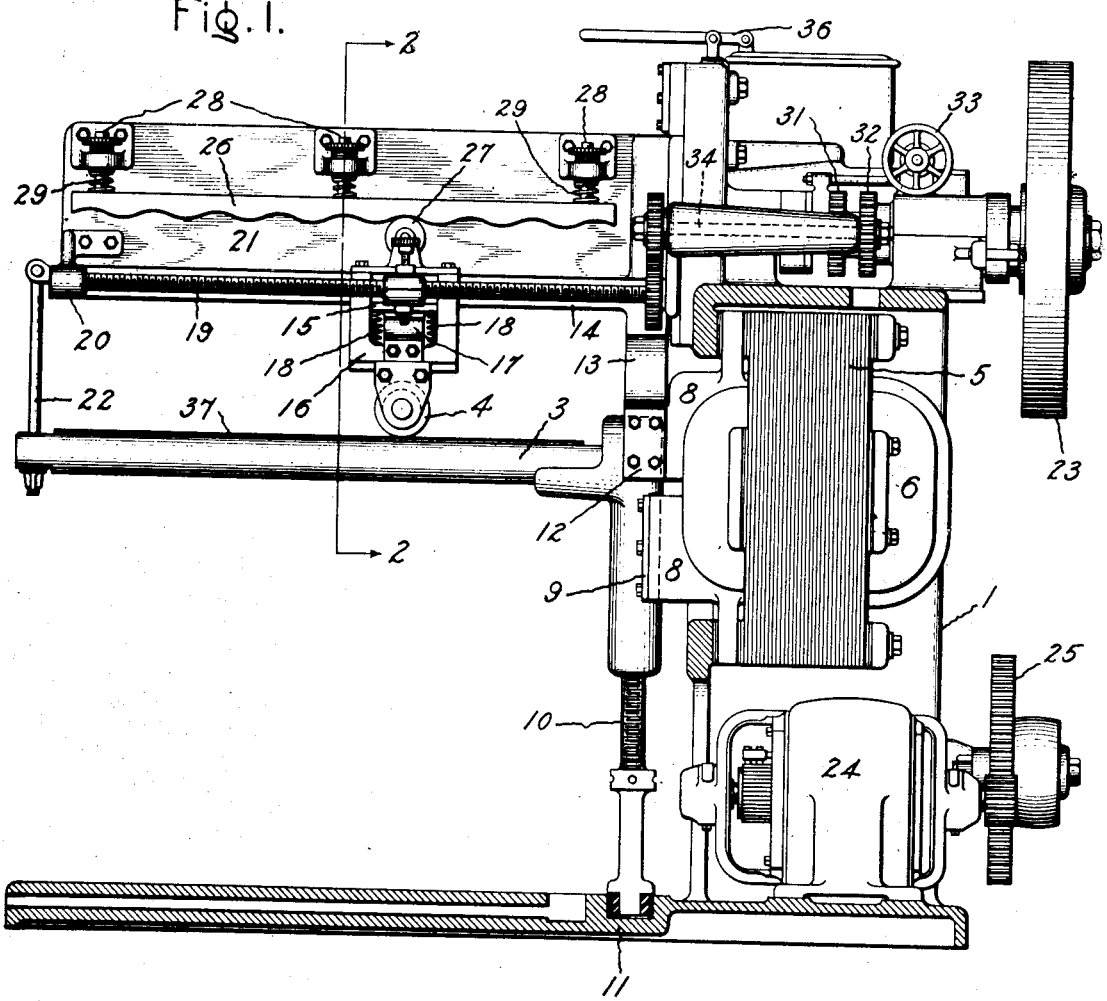
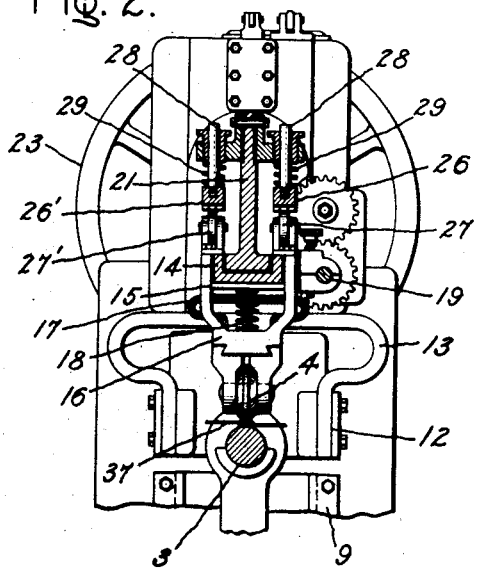
Inventor:
Henry Geisenhöner,
by his Attorney.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

PROCESS AND APPARATUS FOR PRODUCING LINE-WELDS.

1,264,058. Specification of Letters Patent. Patented Apr. 23, 1918.

Application filed September 29, 1916. Serial No. 122,935.

*To all whom it may concern:*

Be it known that I, HENRY GEISENHÖNER, a citizen of the United States, residing at Schenectady, county of Schenectady, State of New York, have invented certain new and useful Improvements in Processes and Apparatus for Producing Line-Welds, of which the following is a specification.

The present invention relates to the art of electric welding and its object is to produce line welds between objects to be united which will not cause buckling in the sheets or other objects to be united.

In accordance with my invention the weld is produced by intermittently varying the pressure between the welding electrodes while the weld is in progress, the welding current being continuously applied. In other words, the weld is produced by continuously applying to the work a welding current but varying the welding pressure during successive intervals between a low and a high value.

In the accompanying drawings Figure 1 is a side elevation of a welding machine embodying my invention, and Fig. 2 is a sectional view taken on the line 2—2.

The welding machine comprises a frame 1, on which is mounted a stationary electrode 3 consisting of a bar on which the work or object to be welded is supported, and a movable electrode 4, consisting of a wheel movable along the work. The welding current is supplied by a transformer having a core 5, a primary winding 6 and a low voltage secondary winding 8. The terminal 9 of the transformer secondary is connected directly to the adjustable standard 10 carrying the bar electrode 3, this standard being insulated from the base 11 as indicated. The terminal 12 of the transformer is connected by a conductor 13 better seen in Fig. 2, to a conductor bar 14. The electrical circuit is completed by a shoe 15 connected to the casing 16 by a flexible conductor 17, and urged against the bar 15 by springs 18. The electrode 4 is revolubly mounted on the casing 16 and is in electrical contact therewith. The casing 16 is geared by a nut and screw drive to a threaded rod 19, suitable electrical insulation being provided. The rod 19 rests on a bearing 20 of the supporting bracket 21, the latter is also connected to the bar electrode 3 by a rod 22. The bracket 21 is insulated from the conductor bar 14 by suitable electrical insulation as indicated.

The rod 19 whereby motion is imparted to the welding electrode is geared to the pulley wheel 23. A motor 24, mounted on the base 11 in common with the welding machine, serves to drive the pulley 23 through a belt (not indicated) or any other suitable means, speed reduction being secured by the gearing 25.

Mounted upon each side of the welding head, or bracket 21, are cam guides 26, 26', having a waved edge engaging with the guide wheels 27, 27', mounted on the casing 16. These cams are fastened to the bracket 21 by pins 28 passing through cushioning springs 29.

When power is imparted to the pulley wheel 23 and the gear wheels 31, 32, are meshed by means of the hand-wheel 33, the shaft 34 and the rod 19 are rotated and the casing 16 travels along the welding bar 3. As the guide wheels 27, 27' follow the undulations of the stationary cam guides 26, 26', the casing 16 and the guides 26, 26' are moved up and down against the springs 18, and 29 respectively thereby imparting periodically varying pressure to the parts to be united held between the welding electrodes 3 and 4, as indicated in Fig. 2. With the switch 36 moved to the closed position to complete the electrical circuit, and as the electrodes progress linearly along the work 37, the welding pressure varies between a high and low value. As a result a line weld is produced with a sufficient welding current consisting of a series of overlapping spot welds.

By obtaining in this manner a line weld consisting of a series of spot welds, the qualities of the weld are improved and buckling of the parts when welded is reduced or entirely prevented.

What I claim as new and desire to secure by Letters Patent of the United States, is:

1. The combination of welding electrodes, a source of welding current, means for linearly moving at least one of said electrodes to produce a line weld, and means for automatically varying the pressure upon said electrodes during successive intervals.

2. In a welding machine, a stationary electrode, a movable electrode, means for urging said movable electrode against said stationary electrode, means for linearly moving said movable electrode in welding relation to the stationary electrode while maintaining continuously pressure between said electrodes, and means for varying said pressure during successive intervals.

3. The method of electric line welding which consists in placing the parts to be welded into contact with each other throughout the entire length of the line to be welded, applying to a predetermined section of said line an electric welding current, and progressively moving the section of application of said current while applying a periodically varying welding pressure to the section under operation.

In witness whereof, I have hereunto set my hand this 28th day of September, 1916.

HENRY GEISENHÖNER.